P. A. WISE.
Potato-Digger.
No. 211,450. Patented Jan. 14, 1879.
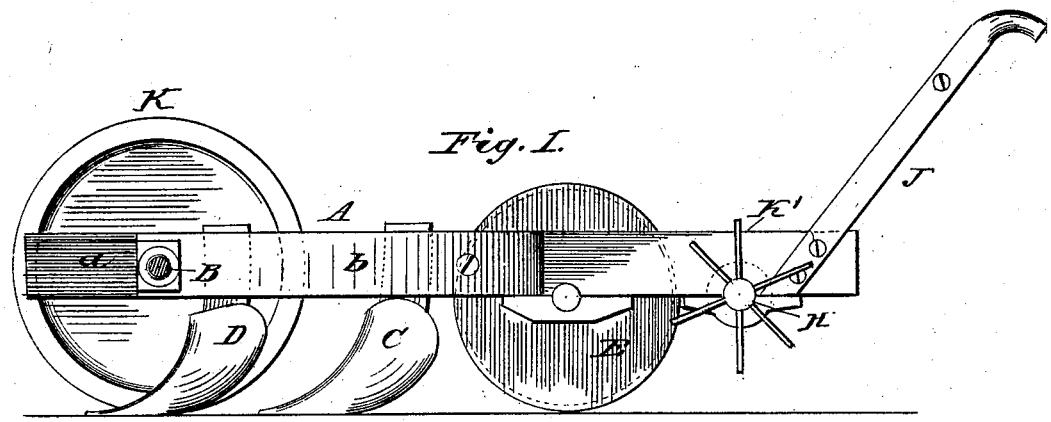
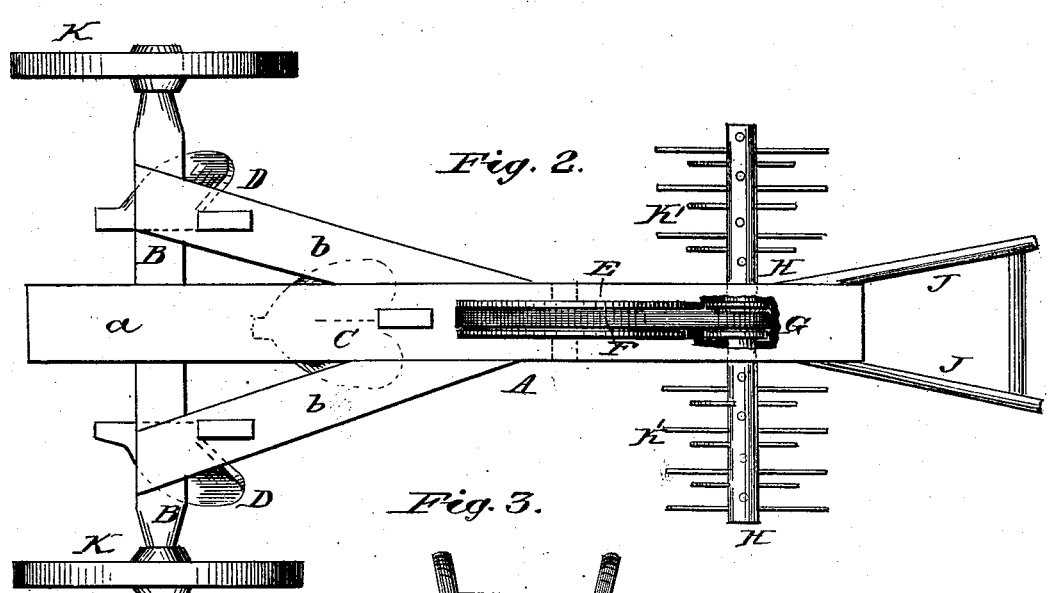
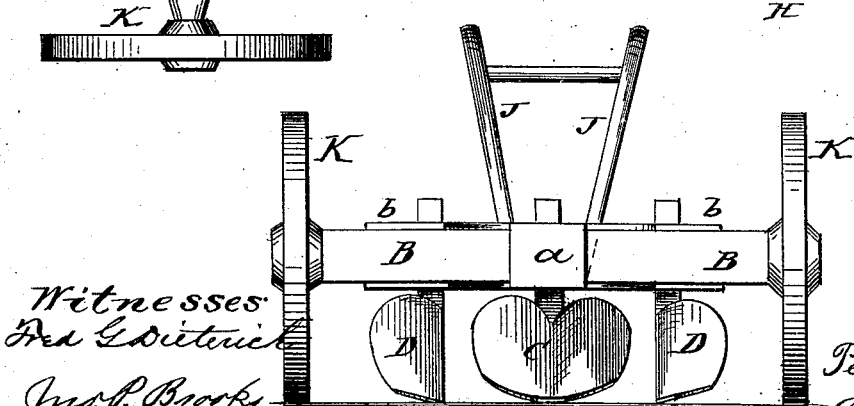
Witnesses
Fred G. Dieterich
Jno. P. Brooks
Inventor
Peter A. Wise,
per C. A. Snow & Co
Attorneys.

UNITED STATES PATENT OFFICE.

PETER A. WISE, OF MARTVILLE, NEW YORK.

IMPROVEMENT IN POTATO-DIGGERS.

Specification forming part of Letters Patent No. 211,450, dated January 14, 1879; application filed April 18, 1878.

*To all whom it may concern:*

Be it known that I, PETER A. WISE, of Martville, in the county of Cayuga and State of New York, have invented certain new and useful Improvements in Potato-Diggers; and I do hereby declare that the following is a full, clear, and exact description thereof, which will enable others skilled in the art to which it appertains to make and use the same, reference being had to the accompanying drawings, which form a part of this specification, and in which—

Figure 1 is a side view, one wheel being removed. Fig. 2 is a top view, and Fig. 3 is a front elevation.

Similar letters of reference denote corresponding parts in all the figures.

This invention relates to certain improvements in potato-diggers; and it consists in the construction and arrangement of parts which I shall now proceed more fully to describe with reference to the drawings hereto annexed, in which—

A is the frame. This consists of the main or tongue beam $a$ and two diverging side beams, $b\ b$, at the ends of which the axle B, which passes through or under the main beam $a$, is secured. The axle B is provided with wheels K K.

D D are two plows arranged at the ends of the beams $b\ b$, to throw the dirt outwardly to both sides. Rear of these, in the main beam $a$, I arrange a double plow, C, which throws the dirt to both sides.

The plows C C D are provided with shanks C' C' D', by which they are adjustable in mortises in the beams $a\ b\ b$. It will be observed that by this arrangement the depth of the furrow may be regulated, while, owing to the wheels K K, which travel upon the surface of the ground, the cut is always even and regular. Rear of the double plow C the beam $a$ has a mortise or slot, in which I arrange a drive-wheel, E, connected by a chain or belt, F, with a smaller wheel or pulley, G, upon the shaft H of a revolving rake, K'. J J are the handles, secured to the main beam rear of the revolving rake.

In operation the plows D D take off the sides of the hill and throw the dirt outward to both sides. The double plow C then follows and takes the crown off the hill and exposes the potatoes, providing at the same time a smooth surface for the drive-wheel E to travel upon, the said drive-wheel following directly in the rear of the double plow. The potatoes are finally by the revolving rake separated from the dirt and left exposed upon the surface, where they may be readily gathered.

I am aware that adjustable plows are not new, broadly considered; hence I lay no claim thereto; but,

Having thus described my invention, I claim and desire to secure by Letters Patent of the United States—

In a potato-digger, the combination of the plows D D, central plow, C, central driving-wheel, E, and revolving rake K, substantially as and for the purpose set forth.

In testimony that I claim the foregoing as my own I have hereto affixed my signature in presence of two witnesses.

PETER A. WISE.

Witnesses:
CHARLOTTE BELL,
JENNIE WISE.